Figure 1:
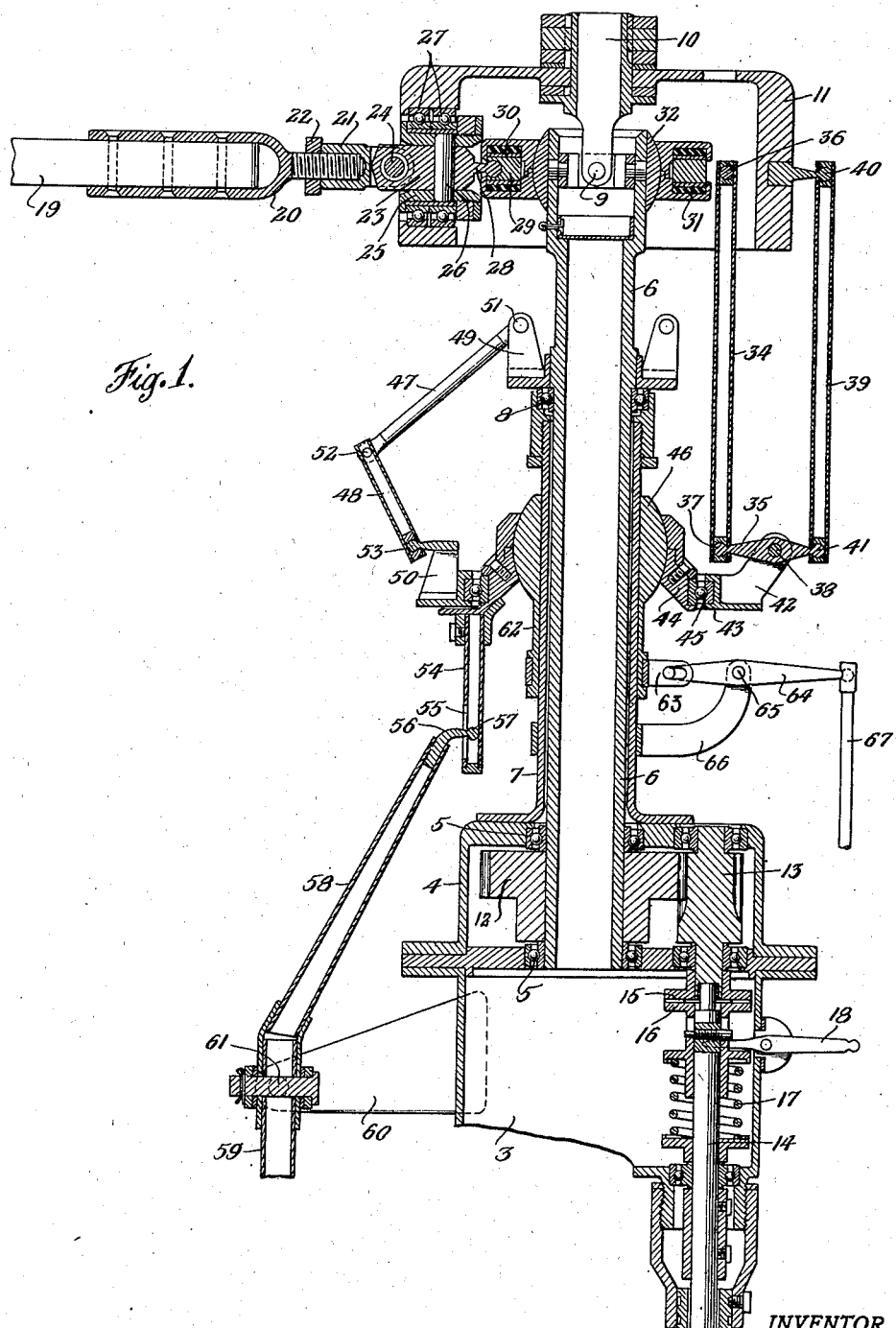

Patented June 29, 1948

2,444,070

UNITED STATES PATENT OFFICE 2,444,070

AIRCRAFT ROTOR PROVIDING FOR TILTING OF AXIS AND BLADE PITCH REGULATION

Paul H. Stanley, Huntingdon Valley, Pa., assignor to Autogiro Company of America, Philadelphia, Pa., a corporation of Delaware Application May 14, 1942, Serial No. 442,911

14 Claims. (Cl. 244—17)

This invention relates to rotative winged aircraft, and is particularly concerned with a novel form of aircraft sustaining rotor.

Aircraft sustaining rotors commonly incorporate a hub and a plurality of blades connected with the hub by means of one or more pivots including, at least, a flapping pivot. During operation of such aircraft, the rotor moves through the air more or less edgewise, the translational flight movement being set up either by the employment of a separate propulsive airscrew (as is customary in autorotative winged aircraft) or by tilting the axis of the rotor (as is frequently proposed for helicopter operation). In either event, the blades experience a wide variation in the direction and velocity of local airflow over the surfaces thereof, the blade advancing in the direction of translational flight being subject to airflow of much higher velocity than the blade which is retreating with respect to the flight direction.

Conditions such as those mentioned above set up periodic fluctuations in effective aerodynamic angle of attack, which fluctuations are of considerable magnitude. One of the principal objects of the present invention is the provision of means automatically introducing periodic changes of blade pitch angle so as to compensate, at least in part, for the fluctuations in effective aerodynamic angle of attack introduced during translational flight.

Additionally, it is an important object of this invention to provide means automatically changing blade pitch angle in a sense to "shed" the effect of air bumps or other disturbances, many of which also tend to set up wide variations in effective aerodynamic angle of attack.

Undesirably extensive variations in angle of attack occur at times during maneuvering of the aircraft, and especially during sharp maneuvers. Moreover, these conditions are particularly noticeable in helicopter type aircraft, wherein the range of flight speeds may vary all the way from true hovering to relatively high speed translational flight, and wherein the rotor may at times be horizontal (as in hovering) or inclined downwardly and forwardly (as in translational flight). It has been found, in fact, that the effect of air disturbances or sharp maneuvering in an aircraft having a power driven rotor introduces variations in effective aerodynamic angle of attack of such magnitude as to exceed safe limits. For instance, under certain conditions, the effective angle of attack at one side of the rotor has been increased momentarily beyond the stalling point.

The arrangement of the invention automatically introduces compensating movements of the blades in the pitch change sense, whereby to reduce or substantially neutralize fluctuations in aerodynamic angle of attack even during sharp maneuvering of a helicopter type machine.

It is a further object of the invention to provide a manually operable mechanism for introducing periodic differential pitch change of the blades, the action of which and of said automatic pitch control means is superimposed one upon the other, thereby providing the advantages of both.

Still further, the invention has in view the provision of means for simultaneously varying the pitch of all blades in the same sense, this simultaneous pitch control also being independent in its action, so that pitch changes of all three types may simultaneously occur.

In accordance with another aspect of the invention, novel structural features are employed in the blade mounting and also in the hub mounting, as will further appear.

How the foregoing and other objects and advantages are attained will appear more clearly from the following description, referring to the accompanying drawings, in which—

Figure 2:
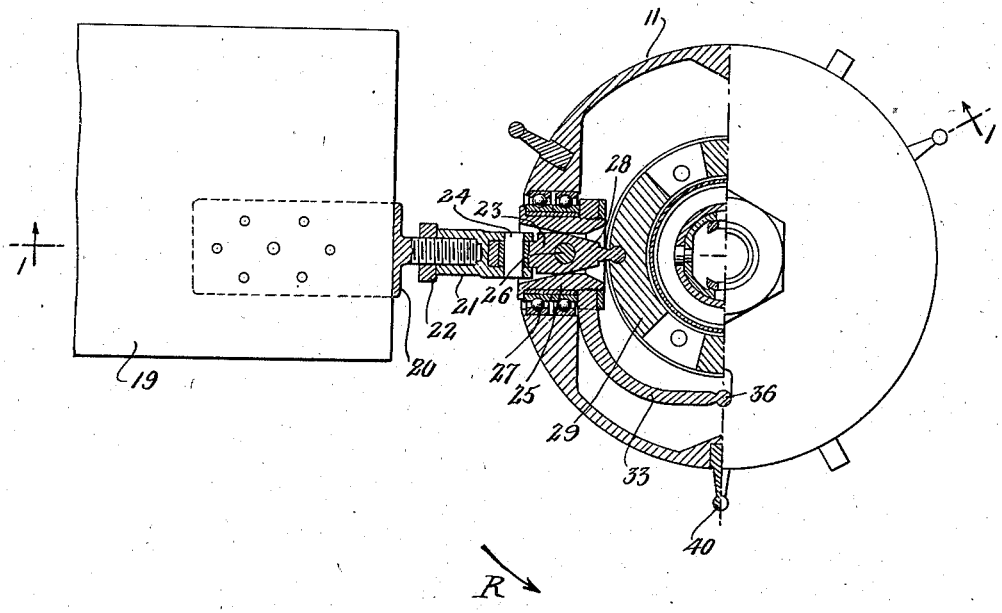

Figure 1 is a vertical sectional view of a rotor hub and mount, the view being taken substantially as indicated by the section line 1—1 on Figure 2; and Figure 2 is a plan view, partly in horizontal section and partly in elevation, illustrating portions of the hub shown in Figure 1.

The rotor hub may be mounted on fixed structure 3. A support 4 is carried on this structure, and within the support a pair of bearings 5—5 cooperates with the rotative hub spindle 6. A non-rotative sleeve 7 is secured to and extends upwardly from the support 4, a bearing 8 being operatively interposed between the upper end of this sleeve and the rotative spindle 6.

At a point spaced appreciably above the upper end of the sleeve 7, the spindle 6 is provided with a universal joint 9, this joint serving to carry the spindle extension 10 to which the bell shaped rotative hub 11 is connected. The joint may desirably be of the constant velocity type so as to enhance smoothness of torque transmission to the hub regardless of the tilted position of the hub on the universal joint.

The spindle 6, and thus the hub, may be driven by means of a gear 12 meshing with a pinion 13 which, in turn, is adapted to be driven from the power shaft 14, the latter being connected with any suitable prime mover in the body of the machine. If the aircraft is of the purely autorotative winged type, shaft 14 would ordinarily be coupled with the engine employed to drive the usual propulsive airscrew. In that type of helicopter in which no propulsive airscrew is employed, the engine would ordinarily be provided chiefly, if not solely, for rotor driving purposes.

In any event, it is contemplated that suitable overrunning and manually controllable clutches should be incorporated in the drive transmission, so that the rotor may rotate freely, at least for the purpose of descent without power, with the blades set at an autorotative angle of attack.

In Figure 1, there is illustrated a dog type clutch for interconnecting pinion 13 and shaft 14, this clutch including toothed parts 15 and 16, the latter of which is urged upwardly by a spring 17 so as to normally maintain engagement. With this arrangement, however, upon failure of the engine, the rotor may freely overrun the drive, the spring 17 yielding as the dog teeth pass each other. This same mechanism may be employed for manual disconnection of the drive, as by a lever 18, by means of which the lower dog 16 may be held in lowered position, against the pressure of spring 17.

As herein disclosed, it is contemplated that the rotor shall incorporate three blades, and it may be mentioned that, in accordance with the invention, the rotor preferably incorporates at least three blades, this being of importance for reasons which will further appear. The inner end of one such blade appears at 19, this blade having a root end mounting member 20 the inner end of which is threaded into a block 21, being secured by a nut 22. Block 21 is forked to receive link 23, the link and block being interconnected by a flapping pivot 24, providing freedom for blade swinging movement in a direction generally transverse the mean rotative path of travel of the blades.

Link 23 projects into a sleeve 25, the sleeve and link being interconnected by a drag pivot 26, providing freedom for lag-lead movement of the blade.

Sleeve 25 is journaled in the hub 11 by means of bearings 27, the axis of which is preferably coincident with the longitudinal axis of the blade, thereby providing for pitch change movement of the blade.

The lag-lead movement of the several blades may be controlled by means of a damper device arranged within and concentrically of the hub, each blade having an inwardly projecting arm 28 cooperating with a ring segment 29 (see Figure 2). The ends of the several segments 29 are spaced from each other, and above and below the segments, friction discs 30 are backed by rubber rings 31, so as to restrain movement of the segment about the axis of the hub. Thereby, movements of the blades in the lag-lead sense are damped or restrained.

Since the hub is free to float about the center point of universal joint 9, the damper device described just above is also mounted for similar floating movement, a spherical seat 32 being provided for this purpose. Preferably, the damper device is free to rotate with respect to hub spindle 6, the effect of which is to permit unrestrained simultaneous lag-lead movement of all of the blades in the same sense. Relative lag-lead movement of the blades (for instance, one forwardly and another rearwardly) is, however, restrained by the action of the damper device.

The damper device and other features of the mechanism for controlling swinging movement of the blades are claimed in my divisional application No. 18,383 filed April 1, 1948.

For the purpose of controlling the pitch angle thereof, each blade is provided with a control arm 33 which is rigidly connected with the sleeve 25 and may, therefore, be used to cause the blade to move about its own longitudinal axis (the axis defined by bearings 27). As seen in Figure 2, the control arm 33 extends forwardly of the blade with reference to the direction of rotation of the rotor (indicated by arrow R), the extension of the arm preferably being to a point approximately 90° in advance of the blade. A vertical link 34 (see Figure 1) interconnects control arm 33 and one end of a lever 35, ball and socket joints 36 and 37 being provided at the upper and lower ends of link 34. Lever 35 is pivoted intermediate its ends, as indicated at 38, the other end of the lever being connected by means of a link 39 with the hub member 11, ball and socket joints 40 and 41 again being provided in this link connection.

Lever 35 is mounted on a bracket 42 projecting from rotative ring 43, it being understood that the linkage parts above described (33 to 42 inclusive) are duplicated for each blade. Ring 43, in turn, is mounted on swash member 44 by means of a bearing 45, the swash member being tiltable in all directions on the ball 46.

Ring 43 is constrained to rotate with the rotor by a "scissors" linkage including link parts 47 and 48. The upper member 47 of the scissors linkage is pivoted to a bracket 49 carried by and rotating with the spindle 6. The lower end of link 48 is connected with a bracket 50 carried by ring 43. The joints 51, 52 and 53 in this linkage are such as to constrain the ring 43 to rotate with the rotor and yet to permit freedom for tilting movement of ring 43 about the center of ball 46, and also to permit vertical movement of ring 43 by means of certain control connections referred to herebelow. For this purpose, a single pivot pin may be used for joint 51 and also for joint 52, although joint 53 preferably comprises a universal or ball joint, the center of which is desirably located in the same plane as the center of ball 46 about which ring 43 is tiltable.

Tilting movement of swash member 44 may be effected through the depending control tube 54, which is slotted as at 55 in order to permit free relative vertical movement of tube 54 and the cooperating actuating part 56, which latter is provided with a ball 57 interiorly of the tube. The operating part 56 projects from the upper end of control arm 58, constituting an extension of the manually operable control member 59 which is carried on a fixed bracket 60 by means of a universal joint 61. The manual control 59, may, therefore, be swung in any direction, and through the arm 58 and parts 54 to 57, these swinging movements may be employed to tilt the swash member 44, likewise in any direction.

The ball 46, which constitutes the seat for swash member 44, has a downwardly extending sleeve 62 carrying an apertured lug 63 by which the ball 46 and thus the swash member, ring 43 and associated parts may be moved vertically. A control for this purpose includes a lever 64 pivoted at 65 to a fixed bracket 66, the free end of this lever cooperating with a manual control, such as the push-pull tube 67.

In considering the operation of the foregoing mechanism, it is first to be observed that the hub 11, and thus the entire rotor, is free to tilt in any direction about the center point of the universal joint 9. The hub and the rotor blades are, therefore, free floating and may take up different planes of rotation, depending upon the forces acting upon the blades. Normally, the blades assume an average position defining a very flat cone, the flapping pivots 24 providing the necessary freedom for the blades to move to this position. The axis of the cone may, of course, be inclined in one direction or another depending upon the conditions under which the machine is operating and, because of the universal mounting of the hub, the axis of the hub will always approximately coincide with the axis of said cone.

Pitch change movements of the blades may take place in three different ways, with the mechanism as above described. Two of these ways are manually controllable and the third is automatic, although it may here be noted that the action of each pitch variation is independent of the other, in the sense that they may take place independently at different times, or at the same time, in which latter case the several effects are superimposed upon each other.

In analyzing the three types of pitch change, reference is first made to the automatic pitch variation. Assume that the control ring 43 is maintained in a horizontal plane, as shown in Figure 1. In this condition, tilting of the hub 11 about the universal 9 will introduce changes of blade pitch angle. For instance, if the hub tilts downwardly at a point 90° in advance of blade 19, as shown in Figure 2, the link 39, which is attached to the hub by joint 40, will similarly be caused to move downwardly, thereby rocking arm 35 and causing link 34 to move upwardly, this latter link being connected with arm 33 by joint 36. It will be seen that tilting movement of the hub in the sense just mentioned causes an increase of the pitch angle of blade 19 (Figure 2). Thus, tilting movement of the hub in one plane causes a change in the effective aerodynamic angle of attack of the blades as they pass through an azimuth generally at right angles to the plane of hub tilting.

Attention is now directed to the fact that, as shown in Figure 1, pivot 38 for lever 35 is located closer to the outer end of the lever than to the inner end thereof, in view of which (in the above example) a given angular tilting movement of the hub will produce a larger angular movement (pitch increase) of the blade. This ratio may not always be required but is of advantage under at least some conditions, or in certain machines, in correcting for the effect of disturbances which may be brought about, for example, during sharp maneuvering.

In further explanation, it is pointed out that the effect of a disturbance at one side of the rotor is to set up a force tending to tilt the rotor hub in a plane at right angles to that point at which the disturbance occurs. Thus, for example, if a disturbance occurs at the left-hand side of Figure 2, the disturbance being in a sense causing decrease of effective aerodynamic angle of attack of blade 19, the blade will tend to ride to a lower position, reaching the lowest point 90° beyond the point of the disturbance. Such a disturbance, therefore, causes the hub 11 to tilt downwardly approximately 90° beyond the position of blade 19. This tilting movement of the hub will influence the pitch of the next following blade so that when it reaches the position at the left of Figure 2, its pitch angle will be increased, thereby compensating for the loss in aerodynamic angle of attack at that side of the rotor brought about by the disturbance.

It will now be seen that the corrective action above described will take place to a degree depending upon the characteristics of the linkage system interconnecting the blades and the hub. In the system illustrated, the degree of correction may be varied by differently locating pivot 38 for the arm 35. As above mentioned, for certain types of machines, and more particularly for aircraft with power driven rotors, wherein the effect of disturbances is most pronounced, the correction should be relatively large. This is attained in the mechanism as illustrated by virtue of location of pivot 38 closer to the outer end of lever 35 than to the inner end thereof. It is also contemplated that pivot 38 may be disposed midway between the two ends of lever 35, or may even be disposed closer to the inner end of lever 35 than to the outer end thereof.

It will be understood, of course, that the action of the pitch control linkage as just described, takes place in opposite senses at diametrically opposite sides of the rotor, this being desirable in order to provide similar compensating conditions throughout the entire circle of rotation. It may also be mentioned that the compensation referred to takes place regardless of the point where the disturbance occurs and, therefore, regardless of the direction of tilting of the hub.

Turning now to the manual controls, it is first mentioned that the control 67, by means of which the swash member 44 may be moved upwardly or downwardly, provides for simultaneous increase and decrease of the mean pitch of all blades of the rotor. This takes place by virtue of raising and lowering the pivotal mounting 38 for the several levers 35. When these pivot points (38) are raised the pitch of all blades is increased, and when lowered the pitch is decreased. Thus, the control 67 may be used to alter the operating conditions of the machine. For example, assuming a helicopter normally having its rotor power driven with the blade angle relatively high, if it is desired to descend without power, the blade angle may be reduced to an appropriate autorotative value.

The control 59, by means of which the swash member may be tilted, is provided primarily for maneuvering purposes. This control operates to raise the pivot point 38 at one side of the rotor and to lower said point at the opposite side, depending upon the direction in which the control 59 is displaced. The effect of differentially raising and lowering opposite pivot points 38 is to introduce periodic differential pitch change of the blades, thereby shifting the lift line of the rotor which in turn, introduces controlling moments in the lateral and longitudinal directions. The control hook-up is preferably such that "instinctive" control is provided of the general character more fully disclosed in copending application of Juan de la Cierva, Serial No. 698,372, filed November 16, 1933, which issued as Patent No. 2,380,582 (corresponding to British Patent No. 410,532). With such a hook-up, when the control stick (or equivalent manual control organ) is moved forwardly, the pitch of the blades at the advancing side of the rotor is decreased and the pitch of the blades at the retreating side of the rotor is increased. The opposite effect takes place upon movement of the control stick rearwardly. A similar action is contemplated for lateral control, by movement of the stick to the right or to the left.

Both of the manual controls referred to just above operate substantially independently of the automatic control although, as above pointed out, all three controls may operate simultaneously, in which event their action is superimposed.

I claim:

1. For an aircraft, a bladed sustaining rotor incorporating a plurality of blades and a hub, each blade being pivotally connected with the hub on an axis offset from the rotational axis thereof and providing for swinging movement of the blade in a direction generally transverse the mean rotative path of travel of the blades, means mounting the hub for free tilting movement in all directions, whereby said hub may float to and rotate in different planes under the influence of blade swinging movements, means providing for pitch change of each blade, and pitch control means for the blades including, for each blade, linkage interconnecting the blade and the hub and providing for increase of blade pitch with respect to the hub upon tilting movement of the hub in a plane angularly offset from said blade.

2. A construction in accordance with claim 1 in which the pitch control means provides for increase of blade pitch with respect to the hub upon downward tilting movement of the hub at a point angularly offset from the blade in the leading direction, with reference to the direction of rotation of the rotor.

3. A construction in accordance with claim 1 in which the pitch control means provides for increase of blade pitch with respect to the hub upon downward tilting movement of the hub at a point angularly offset approximately at right angles from the blade in the leading direction, with reference to the direction of rotation of the rotor.

4. For an aircraft, a bladed sustaining rotor incorporating a plurality of blades and a hub, each blade being pivotally connected with the hub on an axis offset from the rotational axis thereof and providing for swinging movement of the blade in a direction generally transverse the mean rotative path of travel of the blades, means mounting the hub for free tilting movement in all directions, whereby said hub may float to and rotate in different planes under the influence of blade swinging movements, means providing for pitch change of each blade, and mechanism for controlling the pitch of the several blades including, for each blade, a control arm projecting generally circumferentially of the hub to a point angularly offset from the blade, and control linkage interconnecting said arm and the hub at a point in the region of the point first mentioned and providing for variation of pitch of said blade upon tilting of the hub in a vertical plane containing the rotor axis and the said point to which the control linkage is connected with the hub.

5. A construction in accordance with claim 4 in which said control linkage provides for increase of blade pitch upon downward tilting movement of the hub at that side at which the control linkage is connected therewith.

6. For an aircraft, a bladed sustaining rotor comprising a hub and a plurality of blades, each blade being pivotally connected with the hub on an axis offset from the rotational axis of the hub and providing freedom for blade swinging movement in a direction generally transverse the mean rotative path of travel of the blades, means mounting said hub for free tilting movement in all directions, whereby said hub may freely float to different positions under the influence of blade swinging movements, means providing for pitch variation of each blade with respect to the floating hub, and mechanism for controlling the pitch position of the blades including, for each blade, a lever pivotally mounted intermediate its ends, linkage connecting one end of said lever and the blade to provide for pitch change movement of the blade upon pivotal movement of the lever, and linkage interconnecting the other end of said lever and the floating hub, the point of connection of said last mentioned linkage with the floating hub being angularly offset from the blade, the said pitch control mechanism being arranged to provide for increase of blade pitch upon downward tilting movement of the hub at that side at which said linkage is connected therewith.

7. A construction in accordance with claim 6 and further incorporating a controllably tiltable swash member rotatable with the rotor, the said lever of the pitch control mechanism being pivotally mounted on said swash member, and controllable means for varying the plane of rotation of said swash member.

8. A construction in accordance with claim 6 and further including controllable means for raising and lowering the pivotal mountings for the several levers of the pitch control mechanism simultaneously in the same sense.

9. A construction in accordance with claim 6 and further including means for raising and lowering the pivotal mountings for the several levers of said pitch control mechanism differentially and periodically during rotation of the rotor.

10. A construction in accordance with claim 6 and further incorporating a controllably tiltable swash member rotatable with the rotor, the said lever of the pitch control mechanism being pivotally mounted on said swash member, and controllable means for varying the plane of rotation of said swash member, and further including controllable means for raising and lowering said swash member, whereby to simultaneously vary the pitch of all blades in the same sense.

11. For an aircraft, a sustaining rotor including a hub member mounted for rotation and for tilting movement in all directions, a plurality of blades, each pivotally connected with the hub on an axis offset from the rotational axis of the hub and providing freedom for swinging movement of the blade in a direction generally transverse the mean rotative path of travel of the blades, means providing for pitch change of the blades, and mechanism for controlling the pitch angle of the blades including, for each blade, a control arm connected with the blade and extended circumferentially of the hub to a point appreciably offset from that blade, a lever pivotally mounted intermediate its ends, linkage interconnecting one end of said lever and said control arm, and linkage interconnecting the other end of said lever and the hub at a point in the region of the point first mentioned.

12. For an aircraft, a bladed sustaining rotor comprising a plurality of blades having a common central tilting member on which they are pivotally mounted and which in turn is mounted for rotation in addition to tilting, and mechanism for effecting cyclic pitch variation of the blades upon tilt of said member, including pitch-controlling linkages for the several blades operatively coupled respectively to said member at points substantially angularly removed from the respective blades which they control and coupled to the blades to effect a maximum of such cyclic pitch variation of each blade with reference to the aircraft when the blade reaches a position in its rotation correspondingly substantially angularly removed from the plane of tilt of said member.

13. For an aircraft, a bladed sustaining rotor comprising a plurality of blades having a common central tilting member on which they are pivotally mounted and which in turn is mounted for rotation in addition to tilting, mechanism for effecting cyclic pitch variation of the blades upon tilt of said member, including pitch-controlling linkages for the several blades operatively coupled respectively to said member at points substantially angularly removed from the respective blades which they control and coupled to the blades to effect a maximum of such cyclic pitch variation of each blade with reference to the aircraft when the blade reaches a position in its rotation correspondingly substantially angularly removed from the plane of tilt of said member, and means for effecting cyclic blade pitch variation at will.

14. For an aircraft, a bladed sustaining rotor comprising a plurality of blades having a common central tilting member on which they are pivotally mounted and which in turn is mounted for rotation in addition to tilting, mechanism for effecting cyclic pitch variation of the blades upon tilt of said member, including pitch-controlling linkages for the several blades operatively coupled respectively to said member at points substantially angularly removed from the respective blades which they control and coupled to the blades to effect a maximum of such cyclic pitch variation of each blade with reference to the aircraft when the blade reaches a position in its rotation correspondingly substantially angularly removed from the plane of tilt of said member, and means operative by the pilot for effecting cyclic and collective blade pitch variation.

PAUL H. STANLEY.

REFERENCES CITED

The following references are of record in the file of this patent:

UNITED STATES PATENTS

| Number | Name | Date |
|---|---|---|
| 1,992,015 | Rutherford | Feb. 19, 1935 |
| 2,030,578 | Flettner | Feb. 11, 1936 |
| 2,150,129 | Pecker | Mar. 7, 1939 |
| 2,153,610 | Campbell | Apr. 11, 1939 |